United States Patent
Matsui

(10) Patent No.: US 7,810,871 B2
(45) Date of Patent: Oct. 12, 2010

(54) VEHICLE BODY SIDE PORTION STRUCTURE

(75) Inventor: Nobuaki Matsui, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 69 days.

(21) Appl. No.: 11/984,983

(22) Filed: Nov. 26, 2007

(65) Prior Publication Data
US 2008/0122259 A1 May 29, 2008

(30) Foreign Application Priority Data
Nov. 29, 2006 (JP) ............................. 2006-321894

(51) Int. Cl.
*B60R 21/11* (2006.01)
(52) U.S. Cl. ..................... 296/187.12; 296/187.13; 296/193.05; 296/193.06; 296/210
(58) Field of Classification Search ............ 296/187.12, 296/187.13, 203.04, 203.03, 210, 203.01, 296/193.06, 193.05, 193.08, 193.12
See application file for complete search history.

(56) References Cited

U.S. PATENT DOCUMENTS

| | | | | |
|---|---|---|---|---|
| 5,873,618 | A | * | 2/1999 | Ejima ........................... 296/30 |
| 6,073,992 | A | * | 6/2000 | Yamauchi et al. ......... 296/203.01 |
| 6,254,174 | B1 | | 7/2001 | Wee |
| 6,328,376 | B2 | * | 12/2001 | Son ......................... 296/203.03 |
| 6,478,367 | B2 | * | 11/2002 | Ishikawa ................ 296/203.03 |
| 6,962,389 | B2 | * | 11/2005 | Katsuma ................. 296/187.12 |
| 2006/0055209 | A1 | | 3/2006 | Hoshino |
| 2008/0030050 | A1 | * | 2/2008 | Chen et al. ................... 296/210 |

FOREIGN PATENT DOCUMENTS

| | | |
|---|---|---|
| DE | 10 2006 012 974 A1 | 9/2006 |
| EP | 1 108 641 A2 | 6/2001 |
| EP | 1 132 281 A2 | 9/2001 |
| EP | 1 419 953 A1 | 5/2004 |
| JP | A-7-187006 | 7/1995 |
| JP | A-7-300082 | 11/1995 |
| JP | A-8-108865 | 4/1996 |
| JP | A 10-152070 | 6/1998 |
| JP | 11348821 A * | 12/1999 |
| JP | A-2000-142467 | 5/2000 |

OTHER PUBLICATIONS

Oct. 22, 2009 Office Action issued in Korean Patent Application No. 2007-120205 (with translation).

* cited by examiner

*Primary Examiner*—Patricia L Engle
*Assistant Examiner*—SunSurraye Westbrook
(74) *Attorney, Agent, or Firm*—Oliff & Berridge, PLC

(57) ABSTRACT

A vehicle body side portion structure is disposed with a pair of right and left roof side rails disposed along a vehicle anteroposterior direction on both sides of a roof reinforcement that extends along a vehicle width direction of a roof and connection portions that bond together the roof side rails and the roof reinforcement. First fold portions in vehicle width direction outside end portions of the connection portions are disposed in a position higher in a vehicle vertical direction than second fold portions in vehicle width direction inside end portions of the connection portions. When a side load F equal to or greater than a predetermined value is inputted, the first fold portions rotate and move towards the vehicle upper side with the second fold portions acting as supporting points, the first fold portions become bent so as to become convex towards the vehicle upper side.

16 Claims, 4 Drawing Sheets

VEHICLE BODY SIDE PORTION STRUCTURE

CROSS-REFERENCE TO RELATED APPLICATION

This application claims priority under 35 USC 119 from Japanese Patent Application No. 2006-321894, the disclosure of which is incorporated by reference herein.

BACKGROUND OF THE INVENTION

1. Field of the Invention

The present invention relates to a vehicle body side portion where a pair of right and left roof side rails are disposed along a vehicle anteroposterior direction on both sides of a roof reinforcement that extends along a vehicle width direction of a roof.

2. Description of the Related Art

In a vehicle body, sometimes a roof reinforcement is disposed along the vehicle width direction of a roof as a support member of the upper portion of a center pillar in order to reduce the deformation amount of the center pillar during a side collision. However, ordinarily the vehicle width direction center portion of the roof is high and both vehicle width direction end portions of the roof are low, so when the center pillar receives a load during a side collision, a bending moment in a direction where the roof reinforcement becomes convex towards the vehicle upper side at its vehicle width direction center portion occurs in the roof reinforcement.

For this reason, sometimes coupled portion reinforcements are disposed in the joint portions between the roof reinforcement and the roof side rails in order to prevent deformation of the roof reinforcement and coupling groove portions or the like between the roof and the upper portions of the side outer panels which are load transmission paths (e.g., see Japanese Patent Application Publication No. 10-152070). In this structure, it is necessary to additionally dispose the coupled portion reinforcements which cause a mass increase.

SUMMARY OF THE INVENTION

In view of these circumstances, it is an object of the present invention to provide a vehicle body side portion structure that can prevent or control deformation of a roof reinforcement during a side collision while also controlling a mass increase.

A vehicle body side portion structure of a first aspect of the invention comprises: a pair of right and left roof side rails disposed along a vehicle anteroposterior direction on both sides of a roof reinforcement that extends along a vehicle width direction of a roof; and connection portions disposed with at least one of first flanges that extend substantially inward in the vehicle width direction from the roof side rails and second flanges that extend substantially outward in the vehicle width direction from longitudinal direction end portions of the roof reinforcement, the at least one of the first and second flanges being flanges for bonding together the roof side rails and the roof reinforcement, with first fold portions being formed in vehicle width direction outside end portions of the at least one of the first and second flanges and second fold portions being formed in vehicle width direction inside end portions of the at least one of the first and second flanges, and with the first fold portions being disposed in a position higher in a vehicle vertical direction than the second fold portions.

According to the vehicle body side portion structure of the first aspect of the invention, the pair of right and left roof side rails are disposed along the vehicle anteroposterior direction on both sides of the roof reinforcement that extends along the vehicle width direction of the roof, and the connection portions including at least one of the first flanges and the second flanges are used as flanges for bonding together the roof side rails and the roof reinforcement, so when a side load equal to or greater than a predetermined value is inputted during a side collision, the load is transmitted from the roof side rails o the roof reinforcement via the connection portions.

Here, at the connection portions, the first fold portions formed in the vehicle width direction outside end portions are disposed in a position higher in the vehicle vertical direction than the second fold portions formed in the vehicle width direction inside end portions, so when a side load equal to or greater than a predetermined value is inputted, the first fold portions move towards the vehicle upper side with the second fold portions acting as supporting points, the first fold portions bend so as to become convex towards the vehicle upper side, and the first fold portion sides of the connection portions rotate towards the vehicle upper side and inward in the vehicle width direction. For this reason, a moment occurs in a direction that cancels a bending moment in a direction that normally acts on the roof reinforcement from the roof side rails and causes the roof reinforcement to become convex towards the vehicle upper side at its vehicle width direction center portion, and the load that causes the roof reinforcement to become deformed is controlled. Consequently, the roof reinforcement can be prevented or controlled from deforming towards the vehicle upper side at its vehicle width direction center portion during a side collision without adding coupled portion reinforcements as in the conventional example.

That is, according to the vehicle body side portion structure pertaining to this aspect of the invention, the structure has the excellent effect that it can prevent or control deformation of the roof reinforcement during a side collision while controlling a mass increase.

In the vehicle body side portion structure of the first aspect of the invention, end surfaces that face outward in the vehicle width direction and have a predetermined length substantially along the vehicle vertical direction may be formed on the longitudinal direction end portions of the roof reinforcement, and the second flanges may configure at least part of the connection portions and extend from lower portions of the end portions.

According to the vehicle body side portion structure of this configuration, end surfaces that face outward in the vehicle width direction and have a predetermined length substantially along the vehicle vertical direction are formed on the longitudinal direction end portions of the roof reinforcement, and the second flanges configure at least part of the connection portions and extend from lower portions of the end portions, so when a side load equal to or greater than a predetermined value is inputted, the connection portions including the second flanges deform so as to rotate towards the vehicle upper side and inward in the vehicle width direction and contact the upper portions of the end surfaces of the roof reinforcement. Thus, the load is inputted to the upper portions of the end surfaces of the roof reinforcement, and a moment in a direction that cancels the bending moment in the direction where the roof reinforcement becomes convex towards the vehicle upper side at its vehicle width direction center portion effectively occurs.

That is, according to the vehicle body side portion structure of this configuration, the structure has the excellent effect that it can more effectively cancel the bending moment that causes the load to be inputted from the upper portions of the end surfaces of the roof reinforcement during a side collision and acts on the roof reinforcement.

In the vehicle body side portion structure of the first aspect of the invention, end surfaces facing outward in the vehicle width direction may be formed on the longitudinal direction end portions of the roof reinforcement, and contact surfaces that face the end surfaces via the connection portions in a state where the connection portions have been folded so as to overlap the end surfaces originating at the first fold portions and the second fold portions may be disposed in the roof side rails.

According to the vehicle body side portion structure of this configuration, contact surfaces that face the end surfaces of the roof reinforcement via the connection portions in a state where the connection portions have been folded so as to overlap the end surfaces originating at the first fold portions and the second fold portions are disposed in the roof side rails, so when a side load equal to or greater than a predetermined value is inputted and the connection portions become folded so as to overlap the end surfaces of the roof reinforcement originating at the first fold portions and the second fold portions, the connection portion contact the contact surfaces of the roof side rails. For this reason, the side load is transmitted from the contact surfaces to the end surfaces of the roof reinforcement via the connection portions, and the moment in the cancelling direction more effectively acts.

That is, according to the vehicle body side portion structure of this configuration, the structure has the excellent effect that it can effectively cause a side load to be transmitted to the end surfaces of the roof reinforcement after the connection portions have become folded originating at the first fold portions and the second fold portions during a side collision, and as a result, the structure can more effectively cause the moment in the cancelling direction to act.

In the vehicle body side portion structure of the first aspect of the invention, end surfaces facing outward in the vehicle width direction may be formed on the longitudinal direction end portions of the roof reinforcement, and displacement controlling portions (means) that control relative displacement in the vehicle vertical direction between the end portions and the roof side rails in a state where the connection portions have been folded so as to overlap the end surfaces originating at the first fold portions and the second fold portions may be disposed in the roof side rails.

The displacement controlling portions may include a structure comprising a panel that has a step and is connected.

According to the vehicle body side portion structure of this configuration, displacement controlling portions (means) that control relative displacement in the vehicle vertical direction between the end portions of the roof reinforcement and the roof side rails in a state where the connection portions have been folded so as to overlap the end surfaces of the roof reinforcement originating at the first fold portions and the second fold portions are disposed in the roof side rails, so when a side load equal to or greater than a predetermined value is inputted and the connection portions become folded so as to overlap the end surfaces of the roof reinforcement originating at the first fold portions and the second fold portions, the relative displacement in the vehicle vertical direction of the end portions of the roof reinforcement with respect to the roof side rails is controlled by the displacement controlling means and a state where the end portions of the roof reinforcement contact the roof side rails via the connection portions is maintained. For this reason, the side load is effectively transmitted from the roof side rails to the roof reinforcement, and the moment in the cancelling direction stably acts.

That is, according to the vehicle body side portion structure of this configuration, the structure has the excellent effect that it can cause a side load to be transmitted to the end surfaces of the roof reinforcement without causing the end portions of the roof reinforcement to be relatively displaced in the vehicle vertical direction with respect to the roof side rails after the connection portions have become folded originating at the first fold portions and the second fold portions during a side collision, and as a result, the structure can stably cause the moment in the cancelling direction to act.

A second aspect of the invention provides a vehicle body side portion structure comprising: a roof reinforcement that extends along a vehicle width direction of a roof; a pair of right and left side rails that are disposed along a vehicle anteroposterior direction on both sides of the roof reinforcement; and connection portions that bond together the roof side rails and the roof reinforcement, wherein first fold portions are formed in vehicle width direction outside end portions of the connection portions, second fold portions are formed in vehicle width direction inside end portions of the connection portions, and the first fold portions are disposed in a position higher in a vehicle vertical direction than the second fold portions.

In the vehicle body side portion structure of the second aspect, the first and second fold portions may be configured to bend originating at the first and second fold portions when a load equal to or greater than a predetermined value acts in the vehicle width direction from the roof side rails.

In the vehicle body side portion structure of the second aspect, the connection portions may be disposed with flanges for bonding together the roof side rails and the roof reinforcement including at least one of first flanges that extend substantially inward in the vehicle width direction from the roof side rails and second flanges that extend substantially outward in the vehicle width direction from longitudinal direction end portions of the roof reinforcement.

In the vehicle body side portion structure of the second aspect, the connection portions may include first flanges that extend substantially inward in the vehicle width direction from the roof side rails, and the first and second fold portions may be formed in the first flanges.

In the vehicle body side portion structure of the second aspect, the connection portions may include second flanges that extend substantially outward in the vehicle width direction from longitudinal direction end portions of the roof reinforcement, and the first and second fold portions may be formed in the second flanges.

In the vehicle body side portion structure of the second aspect, the connection portions may include first flanges that extend substantially inward in the vehicle width direction from the roof side rails and second flanges that extend substantially outward in the vehicle width direction from longitudinal direction end portions of the roof reinforcement, and the first and second fold portions may be respectively formed in the first and second flanges.

DETAILED DESCRIPTION OF THE INVENTION

Configuration of Embodiment

Figure 1:
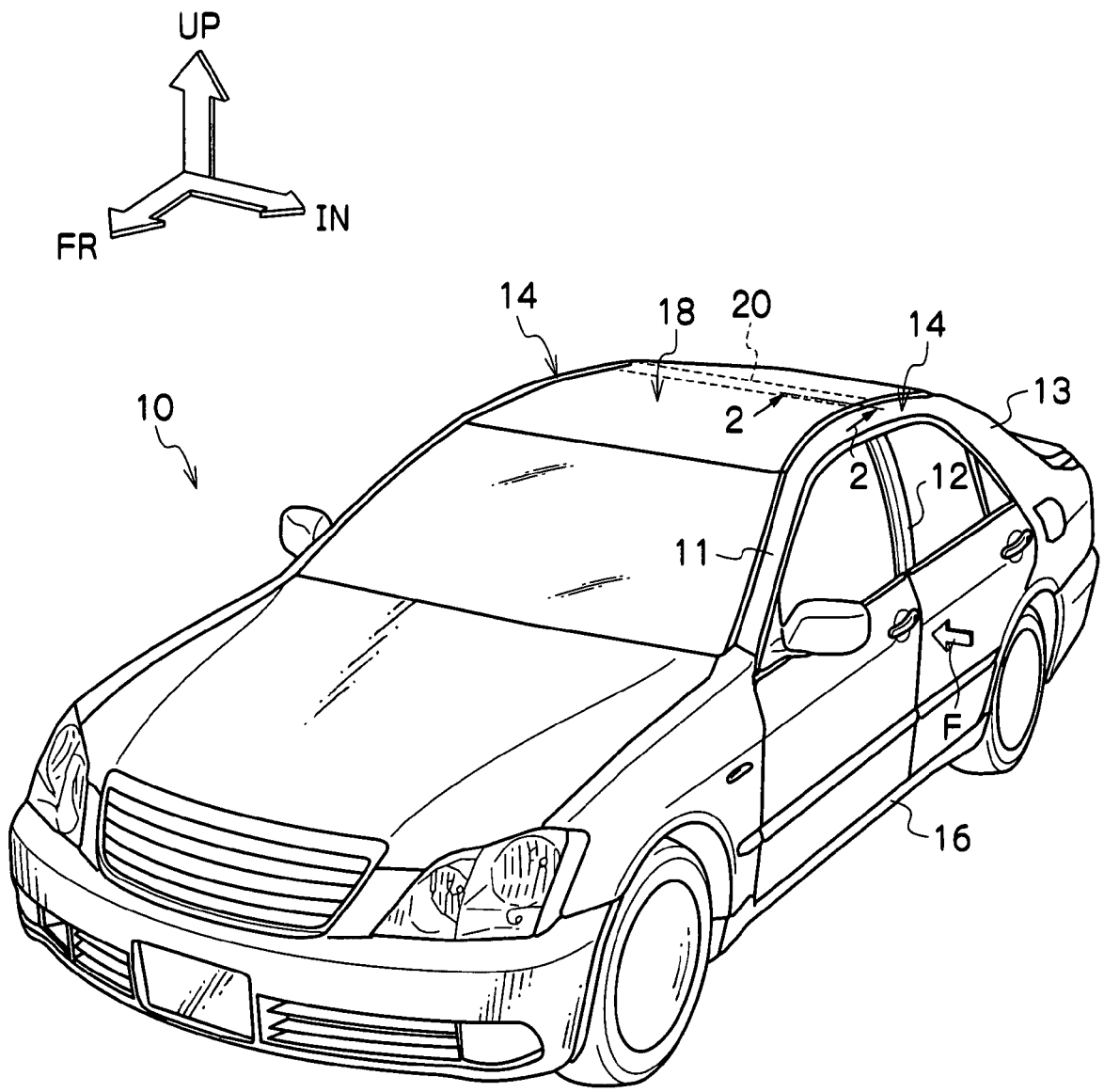
FIG. 1 is a perspective view showing a vehicle to which a vehicle body side portion structure pertaining to an embodiment of the present invention has been applied.

An embodiment of a vehicle body side portion structure of the present invention will be described on the basis of the drawings. It will be noted that arrow UP in the drawings represents the upper direction of the vehicle, arrow FR represents the front direction of the vehicle, and arrow IN represents the inner side in the vehicle width direction.

As shown in FIG. 1, center pillars (B pillars) 12 are disposed in a vehicle 10 along the vehicle body vertical direction at vehicle body anteroposterior direction intermediate portions of vehicle body side portions. The center pillars 12 vertically interconnect vehicle body anteroposterior direction intermediate portions of roof side rails 14 and vehicle body anteroposterior direction intermediate portions of rockers 16 on the lower portion of the vehicle body. It will be noted that front pillars (A pillars) 11 are disposed on the vehicle front side of the center pillars 12 and that rear pillars (C pillars) 13 are disposed on the vehicle rear side of the center pillars 12.

Figure 2:
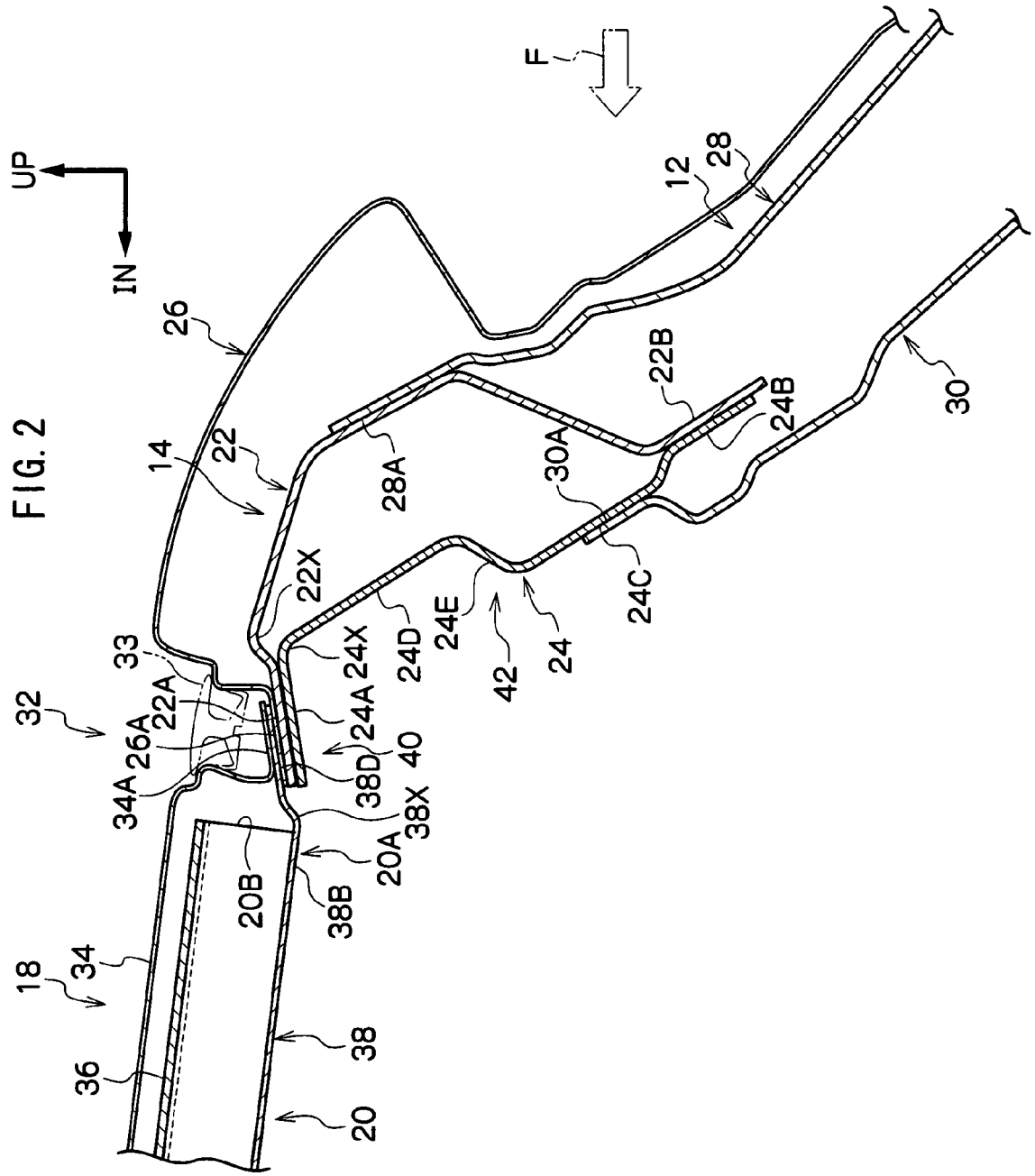
FIG. 2 is a cross-sectional view seen from the direction of arrows 2-2 of FIG. 1.

The roof side rails 14 are disposed as a right and left pair along the vehicle anteroposterior direction on both sides of a roof reinforcement 20 that extends along the vehicle width direction of a roof (vehicle body ceiling) 18 disposed on the upper portion of the vehicle body. Ordinarily, the vehicle width direction center portion of the roof 18 is high and both vehicle width direction end portion sides of the roof 18 are low, and the height dimension of the ceiling underside in the vehicle vertical direction is restricted in order to ensure a large amount of vehicle interior space. As shown in FIG. 2, each of the roof side rails 14 is a structural member configured by a roof side rail outer panel 22 that is disposed on the vehicle interior outside and a roof side rail inner panel 24 that is disposed on the vehicle interior inside. An upper end flange portion 22A serving as a first flange that extends substantially inward in the vehicle width direction from the upper portion of the roof side rail outer panel 22 and an upper end flange portion 24A serving as a first flange that extends substantially inward in vehicle width direction from the upper portion of the roof side rail inner panel 24 are superposed and joined together, and a lower end flange portion 22B that extends substantially towards the vehicle lower side from the lower portion of the roof side rail outer panel 22 and a lower end flange portion 24B that extends substantially towards the vehicle lower side from the lower portion of the roof side rail inner panel 24 are superposed and joined together, to thereby configure a closed cross section. It will be noted that the portions where the upper end flange portions 22A and the upper end flange portions 24A are superposed are positioned in the bottom portions of coupling groove portions 32 that extend in the vehicle anteroposterior direction on both sides of the roof 18 and join together the roof 18 and the upper portions of side outer panels 26. Further, a groove seal member 33 is disposed in each of the coupling groove portions 32.

Each of the side outer panels 26 is disposed on the vehicle interior outside of the roof side rail outer panel 22. An upper end portion 26A is superposed on, and joined together with, the upper end flange portion 22A of the roof side rail outer panel 22. Further, each of the center pillars 12 that are disposed on the vehicle lower side of the roof side rails 14 is configured to include a center pillar outer panel 28 that is disposed on the vehicle interior outside and a center pillar inner panel 30 that is disposed on the vehicle interior inside. An upper end portion 28A of the center pillar outer panel 28 is joined together with the surface of the roof side rail outer panel 22 that faces the vehicle interior outside, and an upper end portion 30A of the center pillar inner panel 30 is joined together with the surface of a panel lower portion 24C of the roof side rail inner panel 24 that faces the vehicle interior inside.

It will be noted that the positions where the aforementioned members are bonded together may be appropriately changed in accordance with the vehicle type. Further, the number of panels configuring these members may also be appropriately changed depending on whether or not reinforcements are disposed.

The roof reinforcement 20 is a reinforcement panel with a closed cross-sectional structure disposed on the vehicle interior inside of a roof panel 34 that configures the roof 18 between the roof side rails 14 on both the right and left sides, and is configured to support the upper portions of the center pillars 12 during a side collision in order to reduce the deformation amount of the center pillars 12 during a side collision. The roof reinforcement 20 is configured in a closed cross section as a result of a roof reinforcement upper 36 on the roof panel 34 side and a roof reinforcement lower 38 on the vehicle interior inside being joined together in the vehicle vertical direction. The optimum plate thickness and cross-sectional height of the roof reinforcement 20 can be determined in accordance with the clearance above the head of an unillustrated passenger.

Figure 3:
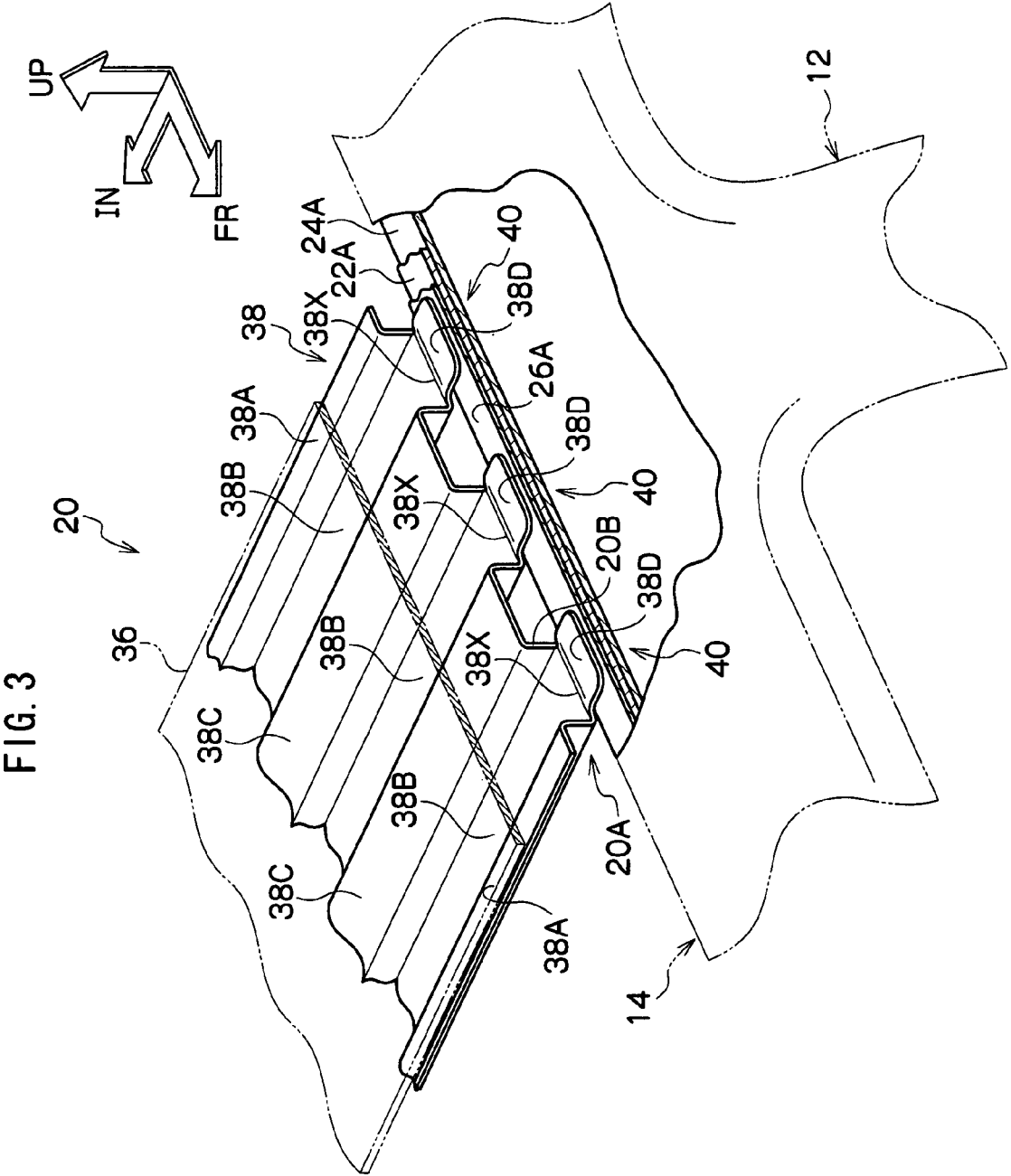
FIG. 3 is a partially broken perspective view of the upper portion of a vehicle body side portion to which the vehicle body side portion structure pertaining to the embodiment of the invention has been applied.

As shown in FIG. 3, upper flange portions 38A that serve as front and rear end portions of the roof reinforcement lower 38 in the vehicle anteroposterior direction are joined together by welding to the inner surface of the roof reinforcement upper 36, and the side sectional shape of the roof reinforcement lower 38 when seen from the vehicle width direction is configured in a bent shape having continuous concavo-convexities, with there being alternately formed downward facing convex portions that protrude towards the vehicle interior and range across substantially the entire length of the roof reinforcement lower 38 in the vehicle width direction and upward facing convex portions that protrude towards the roof reinforcement upper 36 and range across substantially the entire length of the roof reinforcement lower 38 in the vehicle width direction. Bottom portions 38B of the downward facing convex portions are configured to be substantially parallel to the roof reinforcement upper 36, and top portions 38C of the upward facing convex portions are joined together with the inner surface of the roof reinforcement upper 36. It will be noted that the top portions 38C of the upward facing convex portions may also be separated in the vehicle vertical direction from the roof reinforcement upper 36.

End surfaces 20B that face outward in the vehicle width direction and have a predetermined height substantially along the vehicle vertical direction are formed on longitudinal direction end portions 20A of the roof reinforcement 20. Terminal flange portions 38D serving as second flanges extend substantially outward in the vehicle width direction from the lower portions (the bottom portions 38B) of the end portions 20A of the roof reinforcement 20. As shown in FIG. 2, the terminal flange portions 38D are superposed on, and joined (bonded) together with, the upper end portion 26A of the side outer panel 26 on the upper end flange portions 22A and 24A of each of the roof side rails 14. That is, in the present embodiment, connection portions 40 are configured to include the upper end flange portions 22A and 24A of the roof side rails 14 and the terminal flange portions 38D of the roof reinforcement 20, with the upper end flange portions 22A and 24A and the terminal flange portions 38D being configured as flanges for bonding together the roof side rails 14 and the roof reinforcement 20. It will be noted that terminal portions 34A of the roof panel 34 are superposed on, and joined together with, the terminal flange portions 38D of the roof reinforcement 20.

A first fold portion 24X is formed in the vehicle width direction outside end portion of the upper end flange portion 24A of the roof side rail inner panel 24 at an extension position of that upper end flange portion 24A, and second fold portions 38X are formed in vehicle width direction inside end portions of the terminal flange portions 38D of the roof reinforcement lower 38 at extension positions of those terminal flange portions 38D. Here, in the bonded structure between the roof side rails 14 on the center pillar 12 side and the roof reinforcement 20 on the roof 18 side, the connection portions 40 face outward in the vehicle width direction and slant somewhat diagonally upward, so that the first fold portion 24X (fold point when seen in cross section) is disposed in a position higher in the vehicle vertical direction than the second fold portions 38X (fold point when seen in cross section). Thus, in a state where a load F equal to or greater than a predetermined value has been inputted from the vehicle width direction outside, the first fold portion 24X moves towards the vehicle upper side with the second fold portions 38X acting as supporting points and bends so as to become convex towards the vehicle upper side, so that the first fold portion 24X sides of the connection portions 40 rotate towards the vehicle upper side and inward in the vehicle width direction (a reinforcement structure accommodating a side collision).

Further, a bent portion 22X is formed in the vehicle width direction outside end portion of the upper end flange portion 22A of the roof side rail outer panel 22 at an extension position of that upper end flange portion 22A. In the present embodiment, the bent portion 22X is disposed further on the vehicle upper side than a hypothetical extension line portion extending substantially outward in the vehicle width direction in a common plane of the upper end flange portion 22A, configures a fold point having a substantially inverted V-shape when seen in side sectional view, and is disposed at a height position further on the vehicle upper side than the distal end portions of the terminal flange portions 38D. For this reason, the bent portion 22X makes it easier to cause the distal end portion side of the terminal flange portions 38D and the first fold portion 24X side of the upper end flange portion 24A of the roof side rail inner panel 24 to be displaced inward and towards the vehicle upper side when the load F equal to or greater than a predetermined value is inputted form the vehicle width direction outside.

Moreover, in the present embodiment, the second fold portions 38X in the terminal flange portions 38D are recessed further towards the vehicle lower side than a hypothetical extension line portion extending towards the bottom portions 38B in a common plane of the terminal flange portions 38D, and are formed in substantially concave shapes along the entire width of the terminal flange portions 38D. The terminal flange portions 38D are configured to have a low rigidity (to be weakened) at the positions where the second fold portions 38X are formed, and the second fold portions 38X are configured in a shape (bend promoting structure) that promotes bending of the terminal flange portions 38D inward and towards the vehicle upper side originating at the second fold portions 38X when the load F equal to or greater than a predetermined value is inputted from the vehicle width direction outside.

A contact surface 24D is disposed on the upper portion of the roof side rail inner panel 24. This contact surface 24D is disposed in a position facing the end surface 20B via the connection portions 40 in a state where the connection portion 40 have been folded so as to overlap the end surface 20B originating at the first fold portion 24X and the second fold portions 38X. That is, the contact surface 24D is configured as a surface portion for reliably receiving the roof reinforcement 20 when deformation of the connection portions 40 advances during a side collision. In the present embodiment, the upper end portion of the contact surface 24D faces the vehicle upper side and slants somewhat inward in the vehicle width direction.

In the roof side rail inner panel 24 disposed with the contact surface 24D, a step is formed substantially in the vehicle width direction between the contact surface 24D and the panel lower portion 24C, whereby a step structure 42 is formed which serves as displacement controlling means (a displacement controlling portion) where the contact surface 24D falls one step substantially outward in the vehicle width direction with respect to the panel lower portion 24C. The step structure 42 is disposed in order to control relative displacement in the vehicle vertical direction between the end portion 20A and the roof side rail 14 in a state where the connection portions 40 have been folded so as to overlap the end surface 20B originating at the first fold portion 24X and the second fold portions 38X. In this folded state, a wall portion 24E that interconnects the contact surface 24D and the panel lower portion 24C is positioned on the vehicle lower side of the bottom portions 38B of the end portion 20A of the roof reinforcement 20. Further, the upper end flange portions 22A and 24A of the roof side rail 14 function as displacement controlling means that hold the end portion 20A from the vehicle diagonal upper side and control relative displacement in the vehicle vertical direction between the end portion 20A and the roof side rail 14 in a state where the connection portions 40 have been folded so as to overlap the end surface 20B originating at the first fold portion 24X and the second fold portions 38X.

That is, the contact surface 24D, the step structure 42 and the upper end flange portions 22A and 24A of the roof side rail 14 are configured to reliably hold the roof reinforcement 20 when deformation of the connection portions 40 advances during a side collision.

Action and Effects of the Embodiment

Next, the action and effects of the embodiment will be described.

As shown in FIG. 1, the pair of right and left roof side rails 14 are disposed along the vehicle anteroposterior direction on both sides of the roof reinforcement 20 that extends along the vehicle width direction of the roof 18, and as shown in FIG. 2, the upper end flange portions 22A and 24A and the terminal flange portions 38D of the connection portions 40 are configured as flanges for bonding together the roof side rails 14 and the roof reinforcement 20, so when the side load (side collision load) F equal to or greater than a predetermined value is inputted to one of the center pillars 12 during a side collision, the load F is transmitted from the roof side rail 14 to the roof reinforcement 20 via the connection portions 40.

Figure 4:
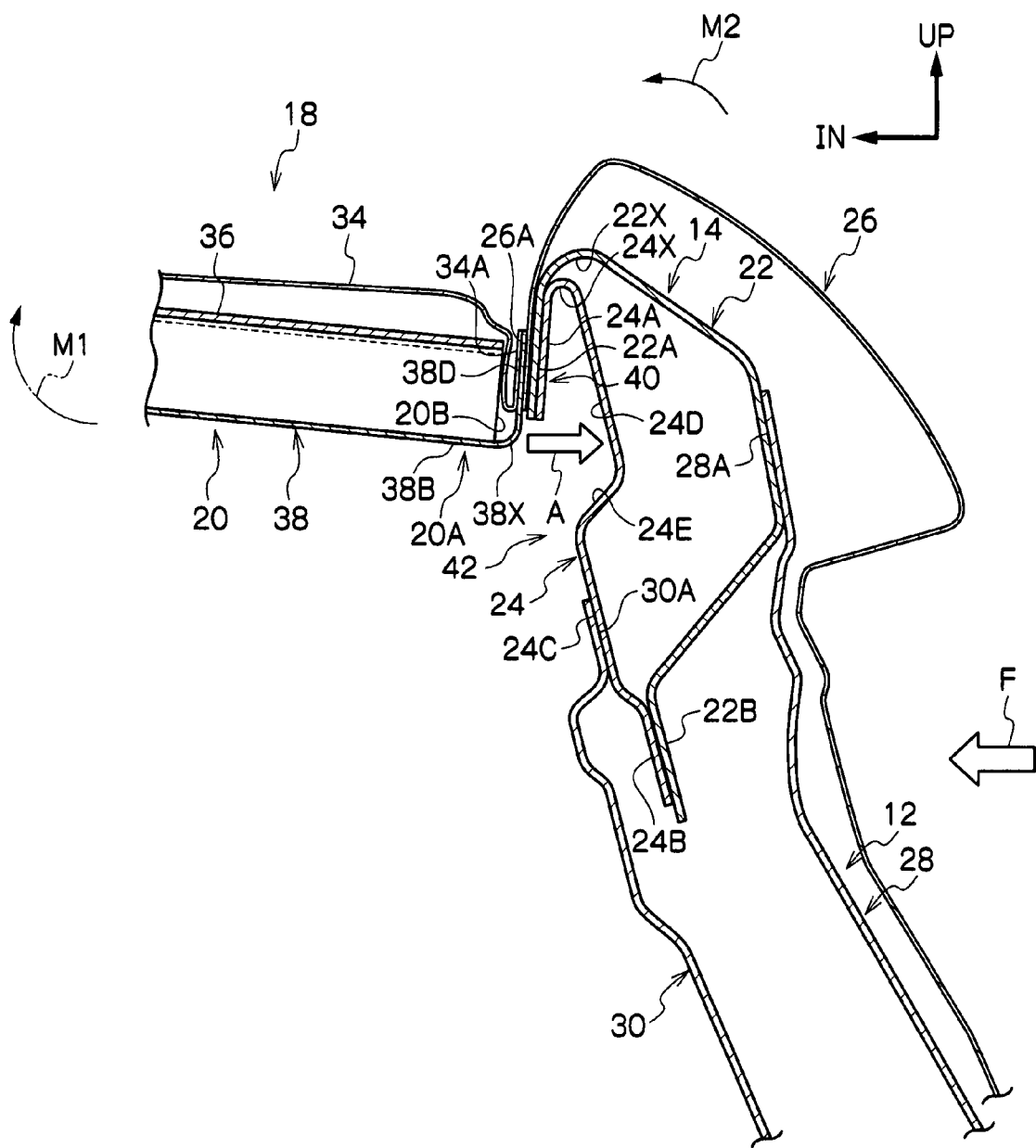
FIG. 4 is a longitudinal cross-sectional view showing a deformed state of the vehicle body side portion during a side collision.

Here, at the connection portions 40, the first fold portion 24X formed in the vehicle width direction outside end portion is disposed in a position higher in the vehicle vertical direction than the second fold portions 38X formed in the vehicle width direction inside end portion, so when the side load F equal to or greater than a predetermined value is inputted, as shown in FIG. 4, the first fold portion 24X rotates and moves (deforms) towards the vehicle upper side with the second fold portions 38X acting as supporting points, the first fold portion 24X bends so as to become convex towards the vehicle upper side, and the first fold portion 24X side of the connection portions 40 rotates and moves towards the vehicle upper side and inward in the vehicle width direction.

Further, as shown in FIG. 2, the end surface 20B that faces outward in the vehicle width direction and has a predetermined length substantially along the vehicle vertical direction is formed on the longitudinal direction end portion 20A of the roof reinforcement 20, and the terminal flange portions 38D of the connection portions 40 extend from the lower portion (the bottom portions 38B) of the end portion 20A, so that with respect to the input of the side load F equal to or greater than a predetermined value, the connection portions 40 including the terminal flange portions 38D deform so as to rotate towards the vehicle upper side and inward in the vehicle width direction, thereafter reliably contact (via the terminal portion 34A side of the roof panel 32) the upper portion of the end portion 20B of the roof reinforcement 20 disposed further on the vehicle upper side than the connection portions 40, and as shown in FIG. 4, the load is inputted from the connection portions 40 including the terminal flange portions 38D to the upper portion of the end surface 20B of the roof reinforcement 20 (from a higher position). In this state, the roof reinforcement 20 reliably supports the center pillar 12.

Because of the above, as shown in FIG. 4, a moment (cancelling moment) M2 occurs in a direction that cancels a bending moment M1 in a direction that normally acts on the roof reinforcement 20 from the roof side rail 14 and causes the roof reinforcement 20 to become convex towards the vehicle upper side at its vehicle width direction center portion, and the load that causes the roof reinforcement 20 to bend and become deformed is controlled (reduction of the bending moment). In this manner, the load input from the upper portion of the end surface 20B of the roof reinforcement 20 during a side collision is made reliable and the bending moment M1 acting on the roof reinforcement 20 is more effectively cancelled, so that the roof reinforcement 20 can be prevented or controlled from bending and deforming towards the vehicle upper side at its vehicle width direction center portion during a side collision while controlling a mass increase (realization of weight reduction).

To add to this, sometimes the plate thickness of a roof reinforcement is made thicker in order to raise the bearing strength of the roof reinforcement with respect to a side load because the roof reinforcement is disposed in a space where its length in the vehicle vertical direction is limited, and in such a case, this leads to a mass increase, but in the present embodiment, a reduction in weight can be realized in comparison the contrastive example of making the plate thickness thicker.

Further, the contact surface 24D that faces the end surface 20B via the connection portions 40 in a state where the connection portions 40 have been folded so as to overlap the end surface 20B of the roof reinforcement 20 originating at the first fold portion 24X and the second fold portions 38X is disposed in the roof side rail 14, so when the side load F equal to or greater than a predetermined value is inputted and the connection portions 40 become folded so as to overlap the end surface 20B of the roof reinforcement 20 originating at the first fold portion 24X and the second fold portions 38X, the connection portions 40 contact the contact surface 24D of the roof side rail 14. For this reason, after the connection portions 40 have been folded originating at the first fold portion 24X and the second fold portions 38X, the side load F is effectively transmitted from the contact surface 24D to the end surface 20B of the roof reinforcement 20 via the connection portions 40, and the cancelling moment M2 more effectively acts. It will be noted that in FIG. 4, arrow A represents the relative moving direction of the roof reinforcement 20 with respect to the contact surface 24D during a side collision.

Further, after the connection portions 40 have been folded so as to overlap the end surface 20B of the roof reinforcement 20, the roof reinforcement 20 cannot move towards the vehicle lower side unless the shape of the step structure 42 in the roof side rail 14 is caused to bend and deform, and the roof reinforcement 20 cannot move towards the vehicle upper side unless the upper end flange portions 22A and 24A in the roof side rail 14 are caused to inversely bend and deform. That is, the relative displacement of the end portion 20A of the roof reinforcement 20 in the vehicle lower direction with respect to the roof side rail 14 is controlled by the step structure 42, and the end portion 20A is held by the upper flange portions 22A and 24A so that relative displacement in the vehicle upper direction with respect to the roof side rail 14 is controlled. Thus, a state where the end portion 20A of the roof reinforcement 20 contacts the contact surface 20D of the roof side rail 14 via the connection portions 40 is reliably held (a holding effect is exhibited), and this holding effect is maintained until the collision phenomenon ends. For this reason, the side load F is effectively transmitted from the roof side rail 14 to the end surface 20B of the roof reinforcement 20, and the cancelling moment M2 stably acts (until the collision phenomenon ends).

Supplementary Description of the Embodiment

In the preceding embodiment, the roof reinforcement 20 of a structure where the roof reinforcement upper 36 and the roof reinforcement lower 38 of a bent shape having continuous concavo-convexities when seen in a side cross section are joined together was used as the roof reinforcement, but a roof reinforcement having another shape, such as a cross-sectionally substantially hat-shaped roof reinforcement directly joined to the undersurface of the roof panel, for example, may also be applied to the roof reinforcement. Whichever structure of roof reinforcement is used may be appropriately selected in view of the vehicle type and the relationship with the vehicle body upper portion structure accompanying the vehicle type.

Further, in the preceding embodiment, the terminal flange portions 38D were configured to input the load to the upper portion of the end surface 20B of the roof reinforcement 20 during a side collision, but even in the case of a structure where the upper portions of the side end surface portions on both vehicle width direction sides of the roof reinforcement are bored inward in the vehicle width direction, for example, and the terminal flange portions (second flanges) are configured to contact the lower portion (further from the center) of the side end surface portions, effects that are the same as those of the preceding embodiment can be obtained as long as the structure is one where the connection portions collapsing in from the center pillar in a side collision state input the rotational force in a direction causing the cancelling moment (M2) to occur.

Moreover, in the preceding embodiment, the second fold portions 38X were formed in a substantially concave shape across the entire width of the terminal flange portions 38D, but the second fold portions may also be simple bent portions. Further, a bend promoting portion such as a concave portion for promoting bending deformation during a side collision may also be formed in the first fold portion 24X in the preceding embodiment. Further, in the preceding embodiment, the bent portion 22X was disposed further on the vehicle upper side than the hypothetical extension line portion extending substantially outward in the vehicle width direction in the common plane of the upper end flange portion 22A, but the bent portion may also be formed on the hypothetical extension line extending substantially outward in the vehicle width direction in the common plane of the upper end flange portion 22A.

Further, in the preceding embodiment, the terminal flange portions 38D extended from the roof reinforcement 20, but another configuration may also be employed where the second flanges (the terminal flange portions 38D) are not disposed on the roof reinforcement but the first flange (at least one of the upper end flange portion 22A and the upper end flange portion 24A) that extends substantially inward in the vehicle width direction from the roof side rail is extended as far as the bottom portion (38B) of the roof reinforcement and joined to that bottom portion, and the first fold portion in the vehicle width direction outside end portion formed in the first flange is disposed in a position higher in the vehicle vertical direction than the second fold portion in the vehicle width direction inside end portion formed in the first flange.

Further, as another example, one end of a thin tab portion separate from the roof reinforcement may be joined to the bottom portion (38B) of the roof reinforcement to form a tongue-like second flange, and the second fold portion may be formed in the vehicle width direction inside end portion (in the vicinity of the position where it is joined to the bottom portion) of this second flange. It will be noted that, within the concept of "second flanges that extend substantially outward in the vehicle width direction from longitudinal direction end portions of the roof reinforcement" in the present invention, there are also included tab portions that are joined to the roof reinforcement and extend substantially outward in the vehicle width direction from the longitudinal direction end portions of the roof reinforcement.

Further, in the preceding embodiment, the step structure 42 and the upper end flange portions 22A and 24A were configured as displacement controlling means, but a plate-like member facing substantially inward in the vehicle width direction may be fixed to a position slightly more on the vehicle lower side than the lower end portion of the contact surface to configure displacement controlling means for regulating the position of the lower side of the end portion of the roof reinforcement.

What is claimed is:

1. A vehicle body side portion structure comprising:
   a pair of right and left roof side rails disposed along a vehicle anteroposterior direction on both sides of a roof reinforcement that extends along a vehicle width direction of a roof; and
   connection portions disposed with first flanges that extend substantially inward in the vehicle width direction from the roof side rails and second flanges that extend substantially outward in the vehicle width direction from longitudinal direction end portions of the roof reinforcement, the first and second flanges being flanges for bonding together the roof side rails and the roof reinforcement, with first fold portions being formed in the roof side rails in the vehicle width direction outside end portions of the first flanges and second fold portions being formed in the roof reinforcement in the vehicle width direction inside end portions of the second flanges, and with the first fold portions being disposed in a position higher in a vehicle vertical direction than the second fold portions, wherein the first and second flanges are superposed on, and joined together with terminal portions of a roof panel.

2. The vehicle body side portion structure of claim 1, wherein end surfaces that face outward in the vehicle width direction and have a predetermined length substantially along the vehicle vertical direction are formed on the longitudinal direction end portions of the roof reinforcement, and the second flanges configure at least part of the connection portions and extend from lower portions of the end portions.

3. The vehicle body side portion structure of claim 1, wherein end surfaces facing outward in the vehicle width direction are formed on the longitudinal direction end portions of the roof reinforcement, and contact surfaces that face the end surfaces via the connection portions in a state where the connection portions have been folded so as to overlap the end surfaces originating at the first fold portions and the second fold portions are disposed in the roof side rails.

4. The vehicle body side portion structure of claim 1, wherein end surfaces facing outward in the vehicle width direction are formed on the longitudinal direction end portions of the roof reinforcement, and displacement controlling portions that control relative displacement in the vehicle vertical direction between the end portions and the roof side rails in a state where the connection portions have been folded so as to overlap the end surfaces originating at the first fold portions and the second fold portions are disposed in the roof side rails.

5. The vehicle body side portion structure of claim 4, wherein the displacement controlling portions include a structure comprising a panel that has a step.

6. The vehicle body side portion structure of claim 1, wherein:
   the roof reinforcement and end portions of the roof panel directly meet in order to define a space between the roof reinforcement and the roof panel.

7. The vehicle body side portion structure of claim 1, wherein:
   the roof side rail has an inner panel and an outer panel, each having ends enclosed by inner and outer panels of a center pillar.

8. The vehicle body side portion structure of claim 1, further comprising:
   a side outer panel engaging an inner panel of the roof side rail and an outer panel the roof side rail at the connection portions.

9. A vehicle body side portion structure comprising:
   a roof reinforcement that extends along a vehicle width direction of a roof;
   a pair of right and left roof side rails that are disposed along a vehicle anteroposterior direction on both sides of the roof reinforcement; and
   connection portions disposed with first flanges that extend substantially inward in the vehicle width direction from the roof side rails, the first flanges being flanges for bonding together the roof side rails and the roof reinforcement, with first fold portions being formed in the roof side rails in the vehicle width direction outside end portions of the first flanges and second fold portions being formed in the roof reinforcement in the vehicle width direction inside end portions of the first flanges, and with the first fold portions being disposed in a position higher in a vehicle vertical direction than the second fold portions, wherein the first flanges are superposed on, and joined together with terminal portions of a roof panel.

10. The vehicle body side portion structure of claim 9, wherein the first and second fold portions are configured to bend originating at the first and second fold portions when a load equal to or greater than a predetermined value acts in the vehicle width direction from the roof side rails.

11. The vehicle body side portion structure of claim 9, wherein end surfaces facing outward in the vehicle width direction are formed on the longitudinal direction end portions of the roof reinforcement, and contact surfaces that face the end surfaces via the connection portions in a state where the connection portions have been folded so as to overlap the end surfaces originating at the first fold portions and the second fold portions are disposed on the roof side rails.

12. The vehicle body side portion structure of claim 9, wherein end surfaces facing outward in the vehicle width direction are formed on the longitudinal direction end portions of the roof reinforcement, and displacement controlling portions that control relative displacement in the vehicle vertical direction between the end portions and the roof side rails in a state where the connection portions have been folded so as to overlap the end surfaces originating at the first fold portions and the second fold portions are disposed on the roof side rails.

13. The vehicle body side portion structure of claim 12, wherein the displacement controlling portions include a structure comprising a panel that has a step.

14. The vehicle body side portion structure of claim 9, wherein:
- the roof reinforcement and end portions of the roof panel directly meet in order to define a space between the roof reinforcement and the roof panel.

15. The vehicle body side portion structure of claim 9, wherein:
- the roof side rail has an inner panel and an outer panel, each having ends enclosed by inner and outer panels of a center pillar.

16. The vehicle body side portion structure of claim 9, further comprising:
- a side outer panel engaging an inner panel of the roof side rail and an outer panel the roof side rail at the connection portions.

* * * * *